Dec. 27, 1927.　　　　　　　　　　　　　　　1,654,385
P. SCHILOVSKY
SUPPORT FOR GYROSCOPIC TURN INDICATORS
Filed June 1, 1927
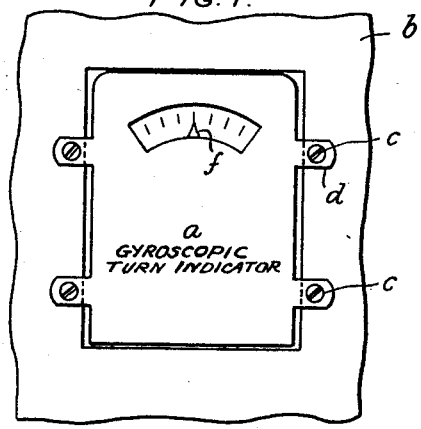
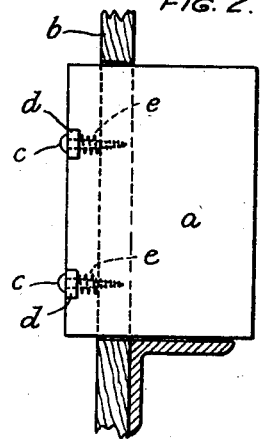
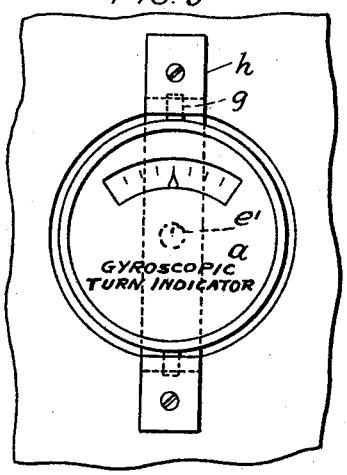
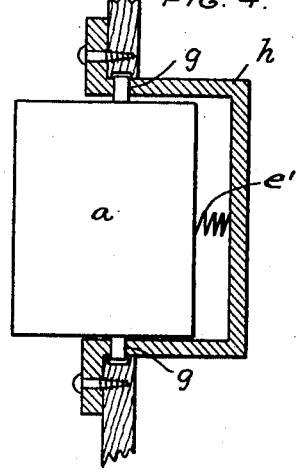
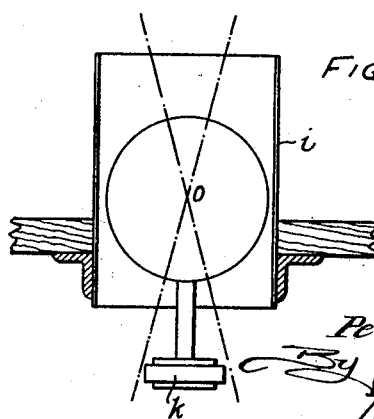
Inventor
Peter Schilovsky,
By
Attorney Patented Dec. 27, 1927.

1,654,385

UNITED STATES PATENT OFFICE.

PETER SCHILOVSKY, OF LONDON, ENGLAND.

SUPPORT FOR GYROSCOPIC TURN INDICATORS.

Application filed June 1, 1927, Serial No. 195,838, and in Great Britain December 18, 1925.

The practical necessity in recent years, both in military and commercial aviation, for making aircraft flights at night and in foggy weather has brought into use gyroscopic apparatus for ascertaining whether the course or horizontal progress of the vessel at any moment is rectilinear or not. Such appartus, which is provided with a pointer and scale or an arrangement of coloured lights to indicate the rate of change of direction in a horizontal plane, is usually rigidly fixed in an aeroplane on the dashboard close to the pilot's seat.

A serious drawback to the use of all instruments of this character is that the pilot has no means of ascertaining when in flight whether the instrument is functioning properly other than by deliberately putting the craft off its course and watching the behaviour of the indicator, nor has he any means at all of testing the instrument before flight when the aeroplane is at rest.

The principal object of the present invention is to enable such tests to be made either when the craft is at rest or when in motion, without any necessity in the latter case of deliberately changing direction.

With this object, according to the present invention the property of gyroscopic turning indicators of indicating not the angle of deflection but the angular speed or rate of change of direction of the aeroplane is utilized, and accordingly the instrument is so mounted that it can have imparted to it at the will of the pilot a considerable angular speed with respect to the aeroplane by imparting to it a relatively small, but rapidly effected, angular displacement, thereby causing a considerable deflection of the indicator if the instrument is functioning properly.

There are various ways of mounting the apparatus to permit of the required relative displacement, some of which are illustrated in the accompanying drawings, wherein Figs. 1 and 2 are respectively a front and a side elevation showing one manner of mounting; Figs. 3 and 4 are corresponding views of another mounting; and Fig. 5 a plan view showing another modified arrangement.

Thus, in Figs. 1 and 2 the gyroscopic turn indicator $a$ or similar gyroscopic instrument, instead of being rigidly fixed to the aeroplane or the like, is supported on the dashboard $b$ by means of screws $c$ which pass freely through lugs $d$ on the casing of the apparatus and are screwed into the dashboard. Springs $e$ in compression between lugs $d$ and dashboard $b$ serve normally to hold the instrument in definite relation with the dashboard, but a pressure manually applied, for example to either side of the instrument by the pilot, will displace the instrument angularly with respect to the dashboard and will result, if the apparatus is working properly, in the pointer $f$ jumping to the extreme range of the scale or to an intermediate point thereof according to the angular velocity imparted to the casing.

Similarly, in the arrangement of Figs. 3 and 4, in which the instrument $a$ is provided with more or less centrally disposed vertical pivots $g$ journalled in a bracket $h$ fixed on the dashboard, a comparatively small angular displacement, effected for example by the pilot's hand, of the instrument upon its pivots $g$ will result in a large precessional deflection of the gyroscope if the latter is running and otherwise functioning properly.

In the modified arrangement of Fig. 5 the outer casing $i$ of the instrument is rigidly fixed to the dashboard, but the gyroscopic mechanism supported within the casing $i$ is free to turn on a hinge or about a pivot indicated at $o$ by giving the knob $k$ a push to the right or left.

Any suitable means, spring or otherwise, for example a tensioned coil spring $e'$ attached between the instrument $a$ and bracket $h$, may be provided for automatically returning the apparatus to normal relation with the dashboard when the deflecting pressure has been withdrawn.

Electrically driven turn indicators may be tested by the means hereinbefore described, either during flight or when the aeroplane is at rest. In the case of an air-driven (Venturi tube) gyroscopic apparatus, a small pressure or vacuum tank connected with the inlet or the suction side, as the case may be, of the Venturi tube is required for operating the gyroscope when the aeroplane is at rest. When the gyroscope has been speeded up the pilot tests the efficiency of the indicator as already described.

Although the invention has been described mainly with reference to aeroplanes, it is equally applicable to other forms of aircraft and also to ships and submarine vessels, and even to land vehicles such as military tanks which may require to use gyroscopic turn indicators and kindred apparatus.

Having thus described the nature of the said invention and the best means I know of carrying the same into practical effect, I claim:—

1. A gyroscopic turn indicator for aeroplanes and other vessels or like apparatus designed to indicate slow angular velocities, comprising a complete instrument, a frame carrying the complete instrument, and means for supporting the said instrument in said frame so that it is at all times capable of angular displacement relatively to its fixed support in a plane containing the axis of the gyroscope.

2. A gyroscopic turn indicator for aeroplanes and other vessels comprising a complete instrument, a frame for carrying the complete instrument, means supporting said instrument in said frame for pivotal movement about an axis other than one coincident with or parallel to the spin axis of the indicator, and means urging said instrument to a definite normal position relative to the frame when momentarily displaced therefrom.

In testimony whereof I have signed my name to this specification.

PETER SCHILOVSKY.